United States Patent [19]

King

[11] Patent Number: 4,728,441

[45] Date of Patent: Mar. 1, 1988

[54] ELECTRICAL WASTE WATER TREATMENT SYSTEM EMPLOYING OXYGEN RECOVERY AND OZONE INJECTION MEANS

[76] Inventor: Arthur S. King, 8021 Cherokee La., Leawood, Kans. 66206

[21] Appl. No.: 906,794

[22] Filed: Sep. 12, 1986

[51] Int. Cl.⁴ .............................................. C02F 1/78
[52] U.S. Cl. .................................... 210/748; 210/760; 204/149
[58] Field of Search ............... 210/748, 760, 620, 627, 210/631, 192, 764; 204/149

[56] References Cited

U.S. PATENT DOCUMENTS

| | | | |
|---|---|---|---|
| 3,829,368 | 8/1974 | Wesley | 204/149 |
| 3,856,671 | 12/1974 | Lee et al. | 210/760 |
| 3,925,176 | 12/1975 | Okert | 210/764 X |
| 4,005,014 | 1/1977 | Wikey | 204/149 X |
| 4,009,104 | 2/1977 | Behrendt et al. | 210/760 X |
| 4,089,761 | 5/1978 | Ramer | 204/149 |
| 4,159,652 | 5/1979 | Wiest | 210/760 |
| 4,179,347 | 12/1979 | Krause et al. | 204/149 |

*Primary Examiner*—Tom Wyse
*Attorney, Agent, or Firm*—Schmidt, Johnson, Hovey & Williams

[57] ABSTRACT

Waste water containing organic materials is first subjected to electrolysis to encourage flocculation of particles contained in the water and is thereafter introduced into an aeration tank where the contents experience aerobic action to reduce their biological oxygen demand before being discharged from the system. During electrolysis, oxygen released by the electrolytic action is captured within an accumulation space above the water level and is drawn off to a heater where it is dried before being introduced into an ozone generator. Ozone from the generator is in turn injected into the aerating tank to promote the aerobic action taking place therein.

2 Claims, 1 Drawing Figure

ELECTRICAL WASTE WATER TREATMENT SYSTEM EMPLOYING OXYGEN RECOVERY AND OZONE INJECTION MEANS

TECHNICAL FIELD

This invention relates to the field of waste water treatment systems and, more particularly, to those in which the waste water is subjected to an electric field to promote purification of the water.

BACKGROUND OF THE INVENTION

Governmental restrictions specify that before industrial waste water can be discharged into environmental streams, the biological oxygen demand (BOD) of the effluent must be satisfactorily lowered. This is typically accomplished by aerating the waste water so that the oxygen-ingesting bacteria contained therein meet their oxygen demands while in the aeration tank instead of in the environmental streams.

I have found that passing the waste water through an electrolytic treater prior to introducing it into the aeration tank has a very beneficial effect on purification of the water, including encouraging particles within the waste water to flocculate and thus more readily settle out as sludge. As a by-product of such electrolysis, oxygen has heretofore been released to the atmosphere without taking advantage of the fact that such oxygen could be utilized in the aeration tank as the means of stimulating aerobic action.

SUMMARY OF THE PRESENT INVENTION

Acccordingly, one important object of the present invention is to provide a method and apparatus for capturing oxygen that has heretofore been treated as a wasted by-product and injecting the oxygen gas into the aeration tank to promote aerobic action. Ideally, the diatomic oxygen molecules are first converted into ozone before being injected into the aerator. By regulating the water level within the electrolytic treater in such a manner that an accumulation space is maintained between the top of the chamber and the water level, the oxygen gas generated during electrolysis can rise to and collect within the accumulation space, to then be drawn off into a heater for drying and subsequent transformation into ozone.

BRIEF DESCRIPTION OF THE DRAWING

The single FIGURE of the drawing illustrates schematically a treating system constructed in accordance with the principles of the present invention, parts being broken away and shown in cross-section to reveal details of construction.

DETAILED DESCRIPTION

Figure 1:
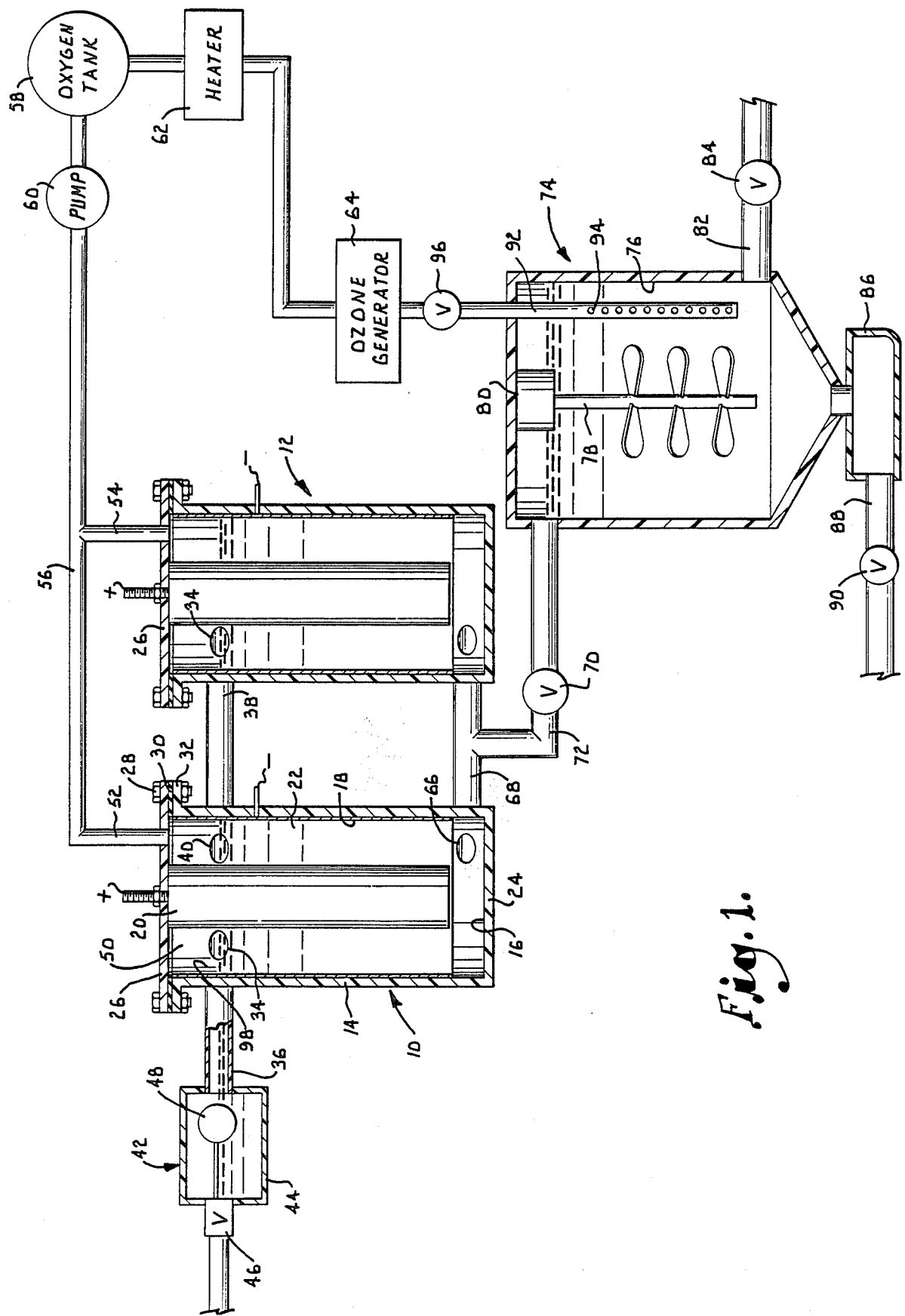

The drawing illustrates a pair of electrolytic treaters 10 and 12 which are essentially of identical construction and are arranged in tandem to provide double the capacity available from only one of the treaters. Each of the treaters 10, 12 includes a plastic housing 14 which is cylindrical in horizontal cross-section to define an interior chamber broadly denoted by the numeral 16. A metal sleeve 18 placed within each chamber 16 and adjacent the wall thereof serves as one electrode of the treater, the opposite electrode being defined by a cylindrical, preferably graphite electrode 20 suspended coaxially within the chamber 16. The two electrodes are connected across opposite sides of a source of electrical potential (not shown) so as to be oppositely charged and thereby create an electric field therebetween within what may be termed a treating region 22 of annular configuration. Each treater 10, 12 is provided with a floor 24 and a top cover 26, the latter being bolted in place using suitable bolts 28 that assist in clamping a sealing gasket 30 tightly against an out-turned flange 32 at the top extremity of the side wall of the treater.

Each treater also includes a tangentially disposed inlet 34 adjacent its upper end for admitting waste water into the treating region 22. In the case of the inlet 34 of treater 10, a waste water inlet conduit 36 communicates therewith leading from a source of waste water supply (not shown). In the case of the inlet 34 of the treater 12, a connecting conduit 38 supplies the same with waste water from a tangential outlet 40 in the treater 10 adjacent the same level as the inlet 34 thereof. Thus, the two treaters 10, 12 are simultaneously supplied with waste water to be treated.

A waste water level control is coupled with the inlet conduit 36 upstream from the treater 10 and is broadly denoted by the numeral 42. Inlet level control 42 includes a collecting basin or tank 44, an inlet valve 46, and a valve actuater float 48 operably coupled with the valve 46 for opening and closing the latter to regulate the admittance of liquid into the basin 44 from upstream portions of the conduit 36. Other types of level control devices could be used such as, for example, electronic devices utilizing spaced contacts that are operable to close a circuit when the contacts are submerged by the rising liquid level and to open a circuit when the contacts are exposed by the falling liquid level.

Regardless of the particular type of level control selected for the control 42, its function is to so regulate the level of waste water within the treating region 22 that the level is not permitted to rise to the top of the treater at any time, thereby defining a constant gas accumulation space denoted by the numeral 50 which overlies the water level and underlies the top cover 26. It should be noted in this respect that the treaters 10, 12 may take on a variety of different configurations which would promote the formation of the accumulation space 50 including, for example, having the top cover 26 formed in the nature of a dome within which rising gas can readily accumulate and be retained above the water level.

The top cover 26 of the treater 10 has a gas outlet conduit 52 rising therefrom that communicates with the accumulation space 50. Similarly, a gas outlet 54 rises from the top cover 26 of the treater 12. Both of the outlet conduits 52, 54 communicate with a common conduit 56 which in turn leads to an oxygen storage tank 58 having a pump 60 on the upstream side thereof for encouraging the movement of gas along the line 56 and into the storage tank 58.

From the storage tank 58, the oxygen gases are pumped into a drying heater 62 in preparation for introduction into an ozone generator 64. The ozone generator 64 may take any one of a number of suitable forms. By way of example, a generator commercialized by the Hankin Environmental Systems Company of Somerville, N.J. is considered acceptable, as is also a generator supplied by Griffin Technics, Inc. of Lodi, N.J.

The two treaters 10, 12 are provided at their lower ends with tangentially disposed waste water outlets 66 which discharge into a common outlet conduit 68 controlled in turn by a shut-off valve 70 in a common discharge line 72. Line 72 leads to an aeration tank 74 having an internally disposed chamber 76 for receiving and holding the electrolytically treated waste water from treaters 10, 12. A suitable mixing device such as schematically illustrated by the numeral 78 is positioned within the chamber 76 and driven by a motor 80 for agitating the contents of tank 74. An effluent discharge line 82 leads from the tank 74 adjacent the lower end of the latter and is controlled by a shut-off valve 84. The lowermost portion of the tank 74 tapers in the nature of a cone or hopper to promote the collection of sludge at that location and gravitation into a holding pod 86 which can be emptied periodically through discharge line 88 controlled by shut-off valve 90.

An ozone supply tube 92 leading from the ozone generator 64 enters the aeration tank 74 through the top of the latter and is provided with a series of outlet ports 94 along its length for introducing ozone from the generator 64 into the body of treater water contained within the tank 74. A control valve 96 within the tube 92 is operable to open and close tube 92.

Operation

The shut-off valve 70 is initially closed so as to allow the treaters 10, 12 to fill their treating region 22 to the level permitted by the level control 42. Thus, the gas accumulation space 50 becomes defined above the water level, such level being indicated by the numeral 98 in the treater 10.

When direct electrical current is applied to the opposite electrodes 18, 20 of each treater, an electric field is created within each region 22 and electrolysis occurs on a variable scale, depending upon the electrolytic nature of the waste liquid being treated. One of the products of such electrolysis is oxygen gas in diatomic molecular form which accumulates within the space 50 and becomes drawn off by the pump 60 and ultimately passed through the heater 62 and the ozone generator 64 for injection into the aeration tank 74, thus encouraging aerobic action in the contents of the tank 74. As is apparent, during the time that the contents of tank 74 are being aerated, the outlet valve 84 is closed, as is the outlet valve 90.

Once the contents of tank 74 have received the desired amount of aeration, the outlet valve 84 is opened, permitting the liquid to be discharged into a clarifying tank or environmental streams, depending upon the degree of purification which has been achieved. Sludge may accumulate within the pod 86 to be periodically removed via the line 80 when valve 90 is opened.

After discharging the contents of aeration tank 74, the valve 84 is reclosed and the valve 70 is opened to allow the contents of treaters 10, 12 to fill the tank 74, whereupon valve 70 is again closed and treaters 10, 12 are allowed to refill to the level permitted by the level control 42.

It should be apparent that the foregoing discloses a single exemplary embodiment of the present invention but that variations in the invention could be made by those skilled in the art without departing from the gist and spirit of the invention. Accordingly, the invention should be limited in scope only by a fair reading of the claims which follow.

I claim:

1. In a method of treating waste water containing organic substances, the steps of:
   exposing the waste water to an electric field to produce electrolysis;
   capturing oxygen gas released from the waste water during electrolysis;
   aerating the waste water after electrolysis;
   introducing oxygen gas captured during electrolysis into the waste water during the aerating step to reduce the biological oxygen demand of the waste water,
   said capturing step including maintaining an enclosed accumulation space above the level of the waste water during electrolysis thereof within which to collect the oxygen gas; and
   transforming diatomic oxygen molecules released during electrolysis into ozone before introducing the oxygen gas in the form of ozone into the waste water during the aerating step.

2. In a method of treating waste water containing organic substances, the steps of:
   exposing the waste water to an electric field to produce electrolysis;
   capturing oxygen gas released from the waste water during electrolysis;
   aerating the waste water after electrolysis;
   introducing oxygen gas captured during electrolysis into the waste water during the aerating step to reduce the biological oxygen demand of the waste water; and
   transforming diatomic oxygen molecules released during electrolysis into ozone before introducing the oxygen gas in the form of ozone into the waste water during the aerating step.

* * * * *